(12) United States Patent
Axnix et al.

(10) Patent No.: US 10,102,152 B2
(45) Date of Patent: *Oct. 16, 2018

(54) PROTECTING A MEMORY FROM UNAUTHORIZED ACCESS

(71) Applicant: International Business Machines Corporation, Armonk, NY (US)

(72) Inventors: Christine Axnix, Dettenhausen (DE); Ute Gaertner, Schoenaich (DE); Jakob C. Lang, Altdorf (DE); Angel Nunez Mencias, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 20 days.

This patent is subject to a terminal disclaimer.

(21) Appl. No.: 15/095,197

(22) Filed: Apr. 11, 2016

(65) Prior Publication Data
US 2017/0132158 A1    May 11, 2017

Related U.S. Application Data

(63) Continuation of application No. 14/934,421, filed on Nov. 6, 2015.

(51) Int. Cl.
*G06F 12/14* (2006.01)
*G06F 12/00* (2006.01)
(Continued)

(52) U.S. Cl.
CPC ...... *G06F 12/1408* (2013.01); *G06F 9/45558* (2013.01); *H04L 9/14* (2013.01);
(Continued)

(58) Field of Classification Search
CPC ............. G06F 9/45558; G06F 9/45533; G06F 2009/45583; G06F 2009/45562;
(Continued)

(56) References Cited

U.S. PATENT DOCUMENTS 8,171,309 B1 *  5/2012  Poo ..................... G06F 11/3648
                                                    713/182
8,589,702 B2 * 11/2013  Lo ............................. G06F 8/71
                                                      713/1
(Continued)

FOREIGN PATENT DOCUMENTS

JP          5736090 B2      6/2015
WO       2014207581 A2     12/2014

OTHER PUBLICATIONS

"A Case for Secure Virtual Append-Only Storage for Virtual Machines" Zhao Lin; Kartik Gopalan; Ping Yang 2010 39th International Conference on Parallel Processing Workshops Year: 2010 IEEE Conference Publications.*

(Continued)

*Primary Examiner* — Jung W Kim
*Assistant Examiner* — Sameera Wickramasuriya
(74) *Attorney, Agent, or Firm* — Stephen R. Yoder

(57) ABSTRACT

A method includes generating a set of virtual-machine-specific (VMS) encryption keys for a dedicated virtual machine, storing the set of VMS encryption keys in a protected memory, storing a first look-up table in the protected memory, and replacing an encryption key stored in a crypto unit with at least one VMS encryption key of the set of VMS encryption keys in an operation mode where the dedicated virtual machine is executed by a processor. The protected memory is selectively excluded from access by operating systems executable on a computer system. The look-up table being accessible only by firmware of the computer system.

11 Claims, 11 Drawing Sheets

(51) Int. Cl.
*G06F 9/455* (2018.01)
*H04L 9/14* (2006.01)
*H04L 29/06* (2006.01)

(52) U.S. Cl.
CPC .............. *G06F 2009/45583* (2013.01); *G06F 2009/45587* (2013.01); *G06F 2212/1052* (2013.01); *H04L 63/0485* (2013.01); *H04L 63/061* (2013.01); *H04L 2209/24* (2013.01)

(58) Field of Classification Search
CPC ........... G06F 2212/222; G06F 12/0804; G06F 2221/2143; G06F 12/1408; H04L 63/0272; H04L 12/4641; H04L 9/14; H04W 12/08; H04W 12/04
See application file for complete search history.

(56) References Cited

U.S. PATENT DOCUMENTS

| | | | | |
|---|---|---|---|---|
| 8,627,112 | B2* | 1/2014 | Chaturvedi | G06F 21/53 713/193 |
| 8,738,932 | B2 | 5/2014 | Lee et al. | |
| 8,782,351 | B2 | 7/2014 | Arges et al. | |
| 8,868,908 | B2 | 10/2014 | MacMillan et al. | |
| 8,949,498 | B2* | 2/2015 | Kagan | G06F 9/45558 710/262 |
| 9,003,203 | B2* | 4/2015 | Bursell | H04L 9/08 713/189 |
| 9,652,634 | B2* | 5/2017 | Wang | G06F 21/64 |
| 2010/0174919 | A1* | 7/2010 | Ito | G06F 21/554 713/192 |
| 2010/0275038 | A1* | 10/2010 | Lin | G06F 21/602 713/193 |
| 2010/0281273 | A1* | 11/2010 | Lee | G06F 21/72 713/190 |
| 2011/0246767 | A1* | 10/2011 | Chaturvedi | G06F 21/53 713/164 |
| 2013/0067245 | A1* | 3/2013 | Horovitz | G06F 12/1408 713/193 |
| 2014/0380311 | A1 | 12/2014 | Deng | |
| 2015/0248357 | A1* | 9/2015 | Kaplan | G06F 12/1408 713/193 |
| 2016/0371496 | A1* | 12/2016 | Sell | G06F 9/45558 |
| 2016/0378522 | A1* | 12/2016 | Kaplan | G06F 12/1408 718/1 |
| 2017/0054557 | A1* | 2/2017 | Rozas | H04L 9/0891 |
| 2017/0132156 | A1 | 5/2017 | Axnix et al. | |
| 2017/0140153 | A1* | 5/2017 | Zimmer | G06F 21/575 |

OTHER PUBLICATIONS

Z. Lin, K. Gopalan and P. Yang, "A Case for Secure Virtual Append-Only Storage for Virtual Machines," 2010 39th International Conference on Parallel Processing Workshops, San Diego, CA, 2010, pp. 245-250. (Year: 2010).*

D. Park, M. D. Yin and J. Cho, "Secure Microcontroller with On-Chip Hierarchical Code Validator for Firmware Authentication," 2014 International Conference on IT Convergence and Security (ICITCS), Beijing, 2014, pp. 1-3. (Year: 2014).*

Sahgal et al., "Understanding Intel® Virtualization Technology (VT)", Digital Enterprise Group, Intel Corporation, 2005, 23 pages, <http://download.microsoft.com/download/9/8/f/98f3fe47-dfc3-4e74-92a3-088782200fe7/TWAR05015_WinHEC05.ppt>.

Szefer et al., "A Case for Hardware Protection of Guest VMs from Compromised Hypervisors in Cloud Computing", Proceedings of the Second International Workshop on Security and Privacy in Cloud Computing (SPCC 2011), Jun. 2011, pp. 1-5.

Appendix P List of IBM Patents and Applications Treated as Related dated May 29, 2018. Two pages.

* cited by examiner

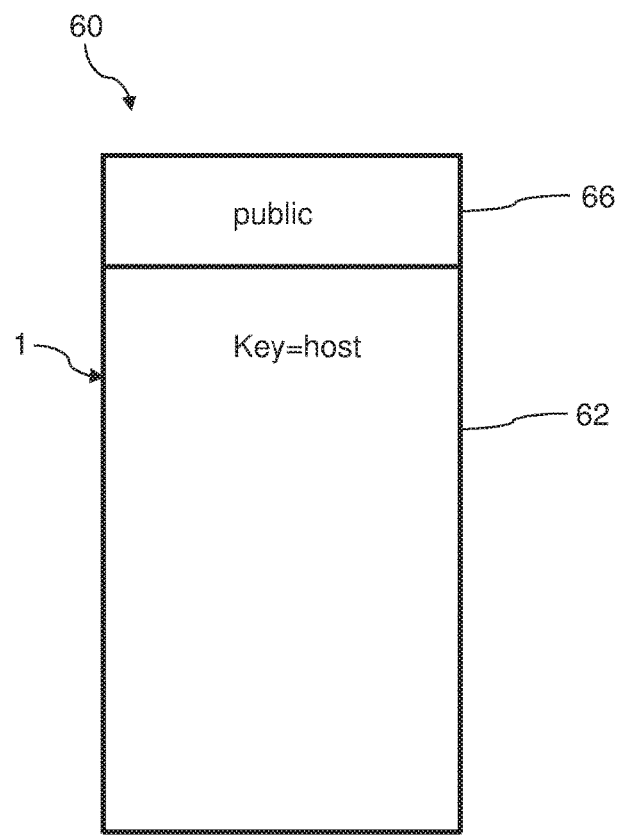

PROTECTING A MEMORY FROM UNAUTHORIZED ACCESS

BACKGROUND

The present invention relates in general to data processing systems, and in particular, to a computer system, a method and a computer program product for protecting contents of a memory in a computer system from unauthorized access.

Virtualization extensions to microprocessors along with hypervisor software allow cloud computing providers to run multiple virtual machines (VMs) on a single physical server. Hypervisor-secure virtualization is proposed for security in cloud computing: to protect guest VMs from attacks by a compromised hypervisor. Specifically, the hypervisor initiates VMs and manages resources as usual, but may not be allowed to snoop on any confidential contents of the VM during its lifetime. Memory is the key asset which should be protected as the potentially sensitive, private or proprietary code or data is stored in the memory which has been assigned to a VM. Hardware enhancements can provide a promising solution. Because the hardware is logically located in hierarchy below the hypervisor software, it can store data and have functionality which cannot be altered by the hypervisor. Furthermore, changing functionality implemented by hardware, and probing the microprocessor chip to recover secrets, are difficult. Consequently, hardware enhancements are a good approach for tackling the threat. Already, virtualization extensions to the microprocessor hardware are widely deployed and major microprocessor vendors provide them in their commodity products.

SUMMARY

A method, computer program product, and computer system includes generating a set of virtual-machine-specific (VMS) encryption keys for a dedicated virtual machine, storing the set of VMS encryption keys in a protected memory, storing a first look-up table in the protected memory, and replacing an encryption key stored in a crypto unit with at least one VMS encryption key of the set of VMS encryption keys in an operation mode where the dedicated virtual machine is executed by a processor. The protected memory is selectively excluded from access by operating systems executable on a computer system. The look-up table being accessible only by firmware of the computer system.

A computer system with a processor and a main memory for protecting contents of the memory from unauthorized access is proposed. The processor is configured to have support for execution of multiple virtual machines. The support may be hardware support or software support or both. The memory is accessible in pages of equal size. The computer system further comprises a crypto unit arranged between the processor and the memory to encrypt or decrypt, respectively, pages written to or read from the memory by the processor by using an encryption key stored in the crypto unit. The computer system comprises (i) means for generating and storing one or more virtual-machine-specific encryption keys for a dedicated virtual machine in a protected memory, the protected memory being selectively excluded from access by operating systems executable on the computer system. The computer system further comprises (ii) at least one look-up table stored in the protected memory, where for the dedicated virtual machine one or more virtual-machine-specific encryption keys are stored, the look-up table being accessible by firmware of the computer system only. And the computer system further comprises (iii) means for replacing the encryption key stored in the crypto unit with at least one of the virtual-machine-specific encryption keys stored in the at least one look-up table, in an operation mode where the dedicated virtual machine is executed by the processor.

BRIEF DESCRIPTION OF THE SEVERAL VIEWS OF THE DRAWINGS

FIG. 2 is a memory layout of a computer system in a host mode;

FIG. 3 is a look-up table for the host mode according to an embodiment of the present invention;

DETAILED DESCRIPTION

For defense in depth, an approach can be to combine both isolation and cryptography. The principles from the isolation-based approach are taken so that the hypervisor can be prevented from accessing memory resources as specified by the customer. The encryption further defends against hardware attacks and protect data at rest.

The illustrative embodiments described herein provide a computer system, a method, and a computer program product for protecting contents of a memory in a computer system from unauthorized access. The illustrative embodiments are sometimes described herein using particular technologies only as an example for the clarity of the description. The illustrative embodiments may be used with a computer system with a processor and a main memory, the processor being configured to have support for execution of multiple virtual machines, the memory being accessible in pages of equal size, the computer system further comprising a crypto unit arranged between the processor and the memory to encrypt or decrypt, respectively, pages written to or read from the memory by the processor by using an encryption key stored in the crypto unit. The support may be hardware or software support.

In some embodiments of the present invention the crypto unit discussed herein is a secure crypto-processor or a cryptographic processor.

Figure 1:
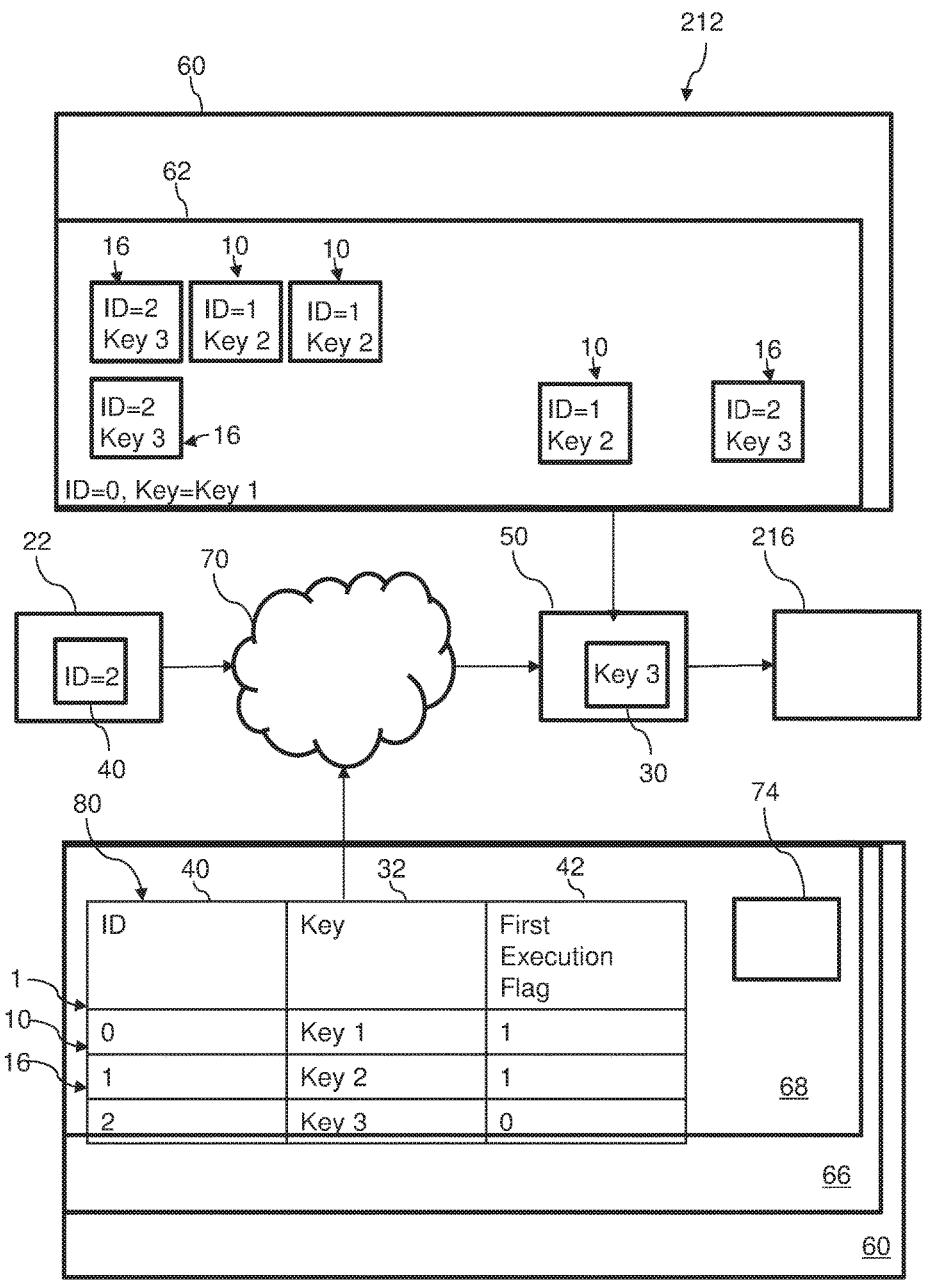
FIG. 1 is a system diagram of a computer system with a crypto unit according to an embodiment of the present invention.

In FIG. 1 a system diagram of a computer system 212 with a crypto unit 50 according to an embodiment of the present invention is depicted. The computer system 212 comprises the processor 216 and the main memory 60. The processor 216 is configured to have support, in this embodiment in particular hardware support, for execution of multiple virtual machines 10, 16. The memory 60 is accessible in pages of equal size, for instance. It should be noted that the pages having equal size is not obligatory. In an alternative embodiment the page size can differ, e.g. some pages with 4K size and some with 1 MB size. The computer system further comprises the crypto unit 50 arranged logically in data transfer between the processor 216 and the memory 60 to encrypt or decrypt, respectively, pages written to or read from the memory 60 by the processor 216 by using an encryption key 30 stored in the crypto unit 50. The crypto unit 50 may be advantageously configured on a cache level between the processor 216 and the memory 60.

The computer system 212 comprises means for generating and storing one or more virtual-machine-specific encryption keys 32 for the dedicated virtual machine 10, 16 in the protected memory 62, the protected memory 62 being selectively excluded from access by operating systems executable on the computer system. In particular, the protected memory 62 is a firmware controlled memory. The means for generating and storing the encryption keys 32 may comprise specific key generating tools realized in hardware and/or firmware of the computer system 212.

At least one look-up table 80 is stored in the protected memory 68 of the firmware 70, where for the dedicated virtual machine 10, 16 one or more virtual-machine-specific encryption keys 32 are stored, the look-up table 80 being accessible by firmware 70 of the computer system 212 only. In the table 80 shown in FIG. 1, ID=0 in column 40 refers to the virtual machine identifier ID of host 1 having KEY 1. ID=1 refers to the virtual machine identifier ID of the virtual machine first level 10 having KEY 2. ID=2 refers to the virtual machine identifier ID of the virtual machine second level 16 having KEY 3.

The look-up table 80 itself may be stored in a protected region of the memory 66 for the firmware controlled area of the main memory 60, protected against access by operating system and hypervisor 74.

The computer system 212 further comprises means for replacing the encryption key 30 stored in the crypto unit 50 with at least one of the virtual-machine-specific encryption keys 32 stored in the look-up table 80, in an operation mode where the dedicated virtual machine 10, 16 is executed by the processor 216. The means for replacing the encryption key 30 in the crypto unit 50 may also be realized as a specific tool in the firmware of the computer system 212. Switching of the virtual-machine-specific encryption key 30 in the crypto unit 50 upon initializing a virtual machine 10 may be performed by a secure instruction 90, provided by specific instruction means.

Allocation means for allocating an identifier 40 and at least one of the virtual-machine-specific encryption keys 32 for each virtual machine 10, 16 being created may also be provided by the firmware 70 of the computer system. Particularly allocation means are provided by the hypervisor 74. The identifier 40 is a unique identifier for each specific virtual machine 10, 16.

In the embodiment of the present invention shown in FIG. 1, the computer system 212 comprises the main memory 60, running a host 1 (indicated in the table as ID=0) with a dedicated protected host memory 62. The host memory 62 is encrypted with the private host key Key 1. Memory regions of the host memory 62 are used by parts of virtual machines 10, 16 running on the system 212, referenced by ID=1 for first level VM 10, encrypted with the key Key 2, as well as ID=2 for second level VM 16, encrypted with the key Key 3. Data from these memory regions may be transferred to the processing unit 216 via the crypto unit 50 which holds the encryption key 30 (in the embodiment shown Key=Key 3 for VM 16) for decrypting the data from the memory 62. The crypto unit 50 gets the right encryption key 30 from the protected firmware memory 68. The firmware memory 68 may be realized as a protected memory region of the memory 66 for the firmware controlled area of the main memory 60. A hypervisor 74 is also running in the firmware memory 68.

Firmware 70 initiates the transfer of the virtual machine specific key 32 from the firmware memory 68 to the crypto unit 50. The firmware 70 gets the necessary information for this transfer from a state descriptor unit 22, where an identifier 40, residing in the state descriptor unit 22, is indicating the virtual machine 16 (indicated in the table as ID=2) currently being initialized. The virtual machine specific encryption key 32 is stored in the look-up table 80, where it can be retrieved by the firmware 70 using the current identifier 40 for the specific virtual machine 16, residing in the state descriptor unit 22. Also a flag 42 indicating if a virtual machine 10, 16 is executed for the first time is residing in the look-up table 80. In the embodiment shown, the flag 42 indicates for the VM 16 that it has not been executed before.

The data of the virtual machines 10, 16 running may be stored in individual distributed segments in the memory 62. Data may be encrypted before written to the memory 62 and decrypted when read from the memory 62 by using the actual key 30 stored in the crypto unit 50, which may be the private virtual-machine-specific encryption key 32 of the respective virtual machine 10, 16. The firmware or hardware clears the key 30 on a virtual machine exit, including the first level virtual machine restore when exiting a second level virtual machine and a host key restore, when exiting a first level virtual machine.

Figure 4:
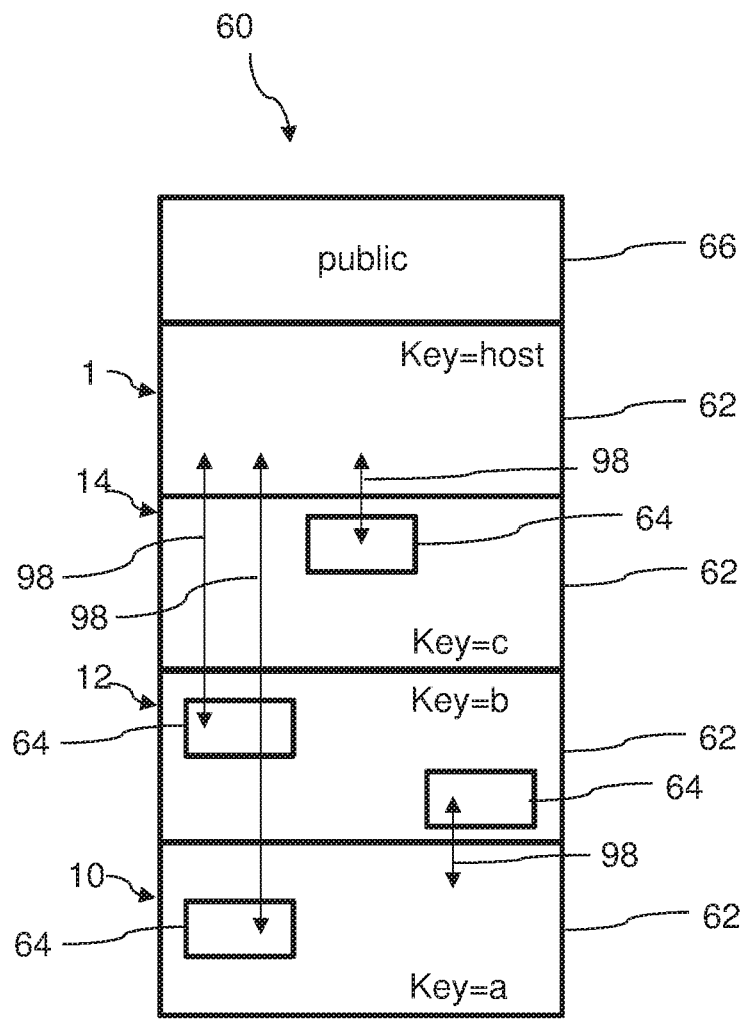
FIG. 4 is a memory layout of a computer system with virtual machines of first level virtualization running according to an embodiment of the present invention.
Figure 6:
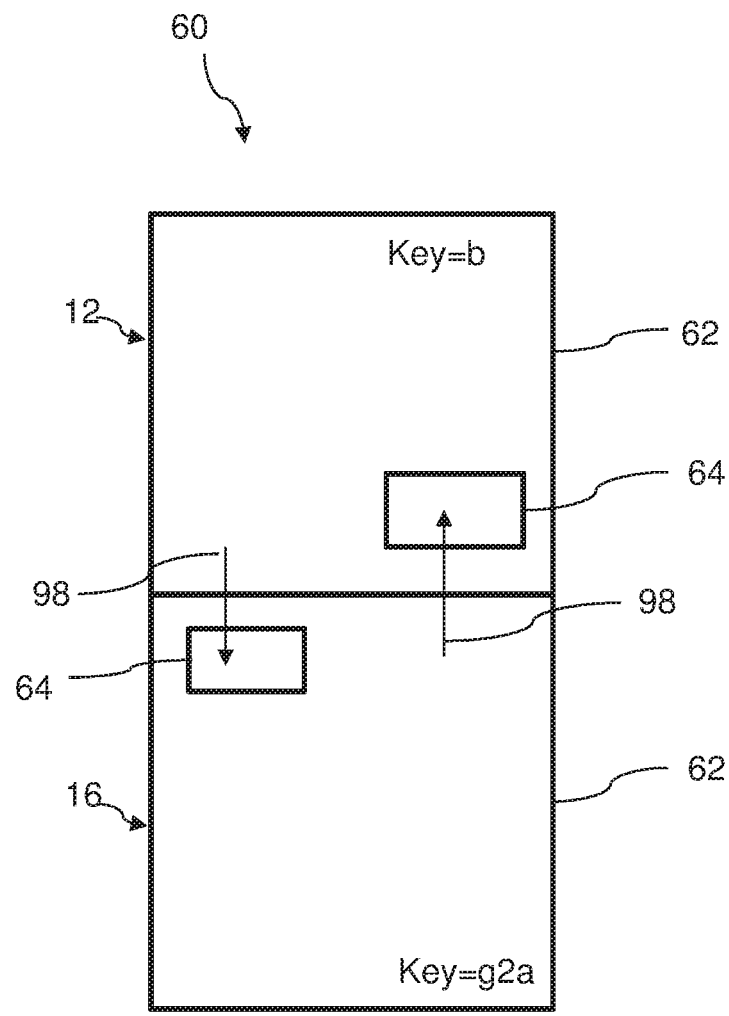
FIG. 6 is a memory layout of a computer system with virtual machines of first and second level virtualization running according to an embodiment of the present invention.

One virtual machine 16 may be created by another virtual machine 10, i.e. the virtual machine 16 is a second level virtual machine, whereas the virtual machine 10 is a first level virtual machine. A tree-like hierarchical structure of virtual machines 10, 16 may exist. The host 1 may create a number of first level virtual machines 10, where each of the first level virtual machines 10 may create a number of second level virtual machines 16. Thus virtual machines 10, 16 of different virtualization level may run at the same time in the memory 60 and exchange data via shared memory regions, as is depicted in FIGS. 4 and 6.

The computer system 212 may provide appropriate hardware registers for storing the different keys. There is a first key register for the key for the firmware controlled memory area as well as a private second key register. The firmware key register will be set up with a special key which cannot be used by a customer program, if virtual machines 10 are initialized on the computer system 212. Firmware 70 is allowed to read/write all memories, therefore the firmware 70 may fetch the keys. In case of pageable second level virtual machines 16 being setup an address translation may use dynamic translation tables from a first level virtual machine. Therefore the respective key is to be setup in the second level virtual machine 16 which will be stored in a translation key register.

The hardware registers described may be implemented as firmware control registers. The hardware may make use of those firmware control registers instead of using real hardware registers. Firmware control registers can be used programmable, thus the firmware can easily make use of different keys.

For initial setup of the computer system 212 a key for the firmware controlled memory area is generated by hardware and written into the hardware register. In the embodiment described the key for the firmware controlled area can only be accessed via firmware 70. In another embodiment the key for the firmware controlled area can only be accessed via hardware. The firmware 70 communicates the need for access of this area to the hardware. The key for the firmware controlled area is the same on all cores of the computer system 212. During initial setup a private host key 32 is generated by the firmware 70. This private host key 32 is written into the hardware and in addition into a look-up table 80 kept in the memory 66 for the firmware controlled area, as shown in FIG. 3. The private host key 32 is used by the hardware per default as long as the system is in the host mode. During initial setup the start address of the look-up table 80 is saved. The host mode is defined as the zone number zero and is always the first entry of the look-up table 80.

FIG. 2 shows a memory layout of a computer system 212 in the host mode. The memory 60 is divided in a memory 66 for the firmware controlled area and a private memory 62 of the host 1, encrypted in the embodiment shown with the host key (indicated in the table as Key=host). The memory 66 for the firmware controlled area is accessible to the host 1, as well as all virtual machines and processes only via firmware. A key for accessing the memory 66 for the firmware controlled area is created by hardware. The key for the private memory 62 of the host 1 is created by firmware. The private memory 62 may only be accessed by the host 1.

In FIG. 3 a look-up table 80 for the host mode according to the embodiment of the present invention of FIG. 2 is shown. The table 80 comprises the identifier 40 of the host 1 (indicated in the table as ID=0), a zone number (indicated in the table as =0) of the memory 62, as well as the private key 32 of the host 1 for accessing the memory 62 (indicated in the table as Key=host). This table 80 may be located in a default key register of the computer system 212.

For initialization of a virtual machine 10 a secure VM start instruction is executed in the firmware 70, which provides the setup of the VM 10. The VM start instruction calls a firmware routine for generating the keys for the VM 10, e.g. a private key 32 of the VM 10, update a host look-up table entry to share data between host 1 and VM 10. An identifier 40 is generated to identify the VM 10. The private keys 32 are written to the hardware. The look-up table 80 in the memory 66 for the firmware controlled area is updated the VM 10 starts execution.

There might be more than one shared memory 64 between VMs. In this case additional shared key fields are added by the firmware 70. Each shared memory field may therefore be provided with a pointer 94 to an additional look-up table 84, where the read access to this shared entry may be stored.

Through firmware support it is possible to define a shared memory 64. As soon as the firmware creates the shared memory 64, the shared memory look-up table 84 and the key look-up table 80 is updated. Only the firmware 70 may access the shared memory 64 and the firmware 70 checks that the requester to be allowed to access the shared memory 64.

FIG. 4 depicts a memory layout of a computer system 212 according to an embodiment of the present invention with virtual machines 10, 12, 14 of first level virtualization running. The memory 60 comprises as shown in FIG. 2 the memory 66 for the firmware controlled area and the private memory 62 of the host 1, setup by the firmware during initialization of the host 1 and being encrypted with the host key (indicated in the table as Key=host). The memory 60 further comprises private memories 62 for the virtual machines 10, 12, 14, encrypted for VM 10 by the corresponding key (indicated in the table as Key=a), for VM 12 by the corresponding key (indicated in the table as Key=b) and for VM 14 by the corresponding key (indicated in the table as Key=c). The private memories 62 of the virtual machines 10, 12, 14 contain shared memory regions 64 with read access 98 for the host 1. The private memory 62 of virtual machine 12 contains a shared memory region 64 with read access 98 for virtual machine 10. Read access is controlled by look-up tables 80, 84, as explained in FIG. 5. The secure memory regions 64 are encrypted by a virtual-machine-specific encryption key 32, 33, 34, 35, 36, 37 for sharing the memory regions 64 between virtual machines 10, 12, 14, 16, 18 of a same or a different virtualization level. Shared memory regions 64 may be used in case of interception or for communication between virtual machines 10, 12, 14 and the host 1.

Figure 5:
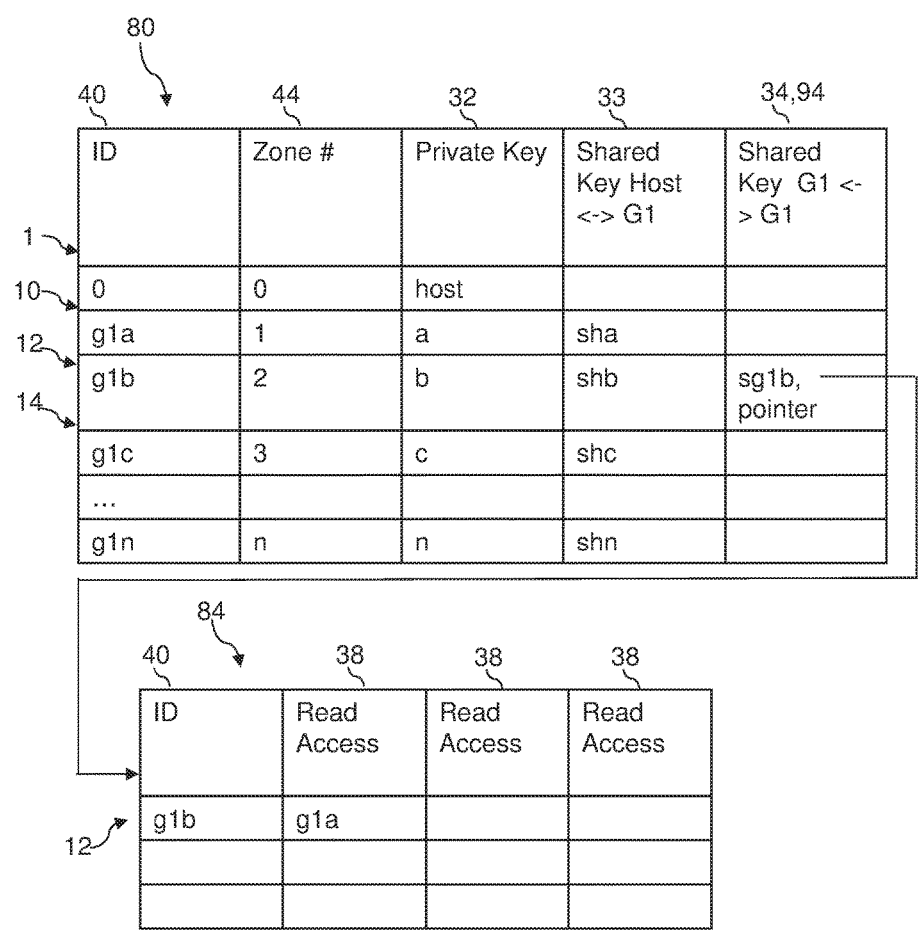
FIG. 5 is a look-up table for the memory layout of FIG. 4 with an extended look-up table according to an embodiment of the present invention.

In FIG. 5 a look-up table 80 for the memory layout of FIG. 4 with an extended look-up table 84 according to an embodiment of the present invention is depicted. The look-up table 80 covers basic information for the host 1 as well as the first level virtual machines like the VMs 10, 12, 14, namely the identifier 40 (indicated in the table as 0, g1a, g1b, g1c, . . . ), the zone number 44 of the memory 60 (indicated in the table as 0, 1, 2, 3, . . . ), the private key 32 for access to the private memory 62 (indicated in the table as host, a, b, c, . . . ). Further the look-up table 80 contains shared keys 33 (indicated in the table as sha, shb, shc, . . . ) for access to shared memory regions 64 between host and virtual machines like VMs 10, 12, 14 as well as shared keys 34 (indicated in the table as sg1b) for access to shared memory regions 64 between the virtual machines like VMs 10, 12, 14 among each other.

Pointer means of the computer system 212, e.g. hardware or firmware routines, are used for providing at least one pointer 94 to be used for extension of the table 80. Table means of the computer system 212, e.g. hardware or firmware routines, are able to provide a new look-up table 84 to be added to the existing look-up table 80 for sharing the memory regions 64, the new look-up table 84 referenced by the pointer 94. The table 84 contains information about the virtual machine where the pointer 94 is initiated like the identifier 40, in the embodiment shown virtual machine 12 (indicated in the table as ID=g1b), and mainly access rights 38 about read access for the shared memory regions 64 (indicated in the table as g1a). The pointer 94 therefore is pointing directly to table 84, where under the identifier of the calling virtual machine 12 information about the access rights of other virtual machines may be found. In the embodiment shown, the shared memory region 64 of virtual machine 12 may be read by the virtual machine 10 (indicated in the table as ID=g1a, Key=a), as indicated in FIG. 4.

For initialization of a second level virtual machine 16 a first level virtual machine 12 issues a VM start instruction, which is executed by the firmware 70 and performs the VM setup. The instruction calls the firmware routine to generate the keys for the second level virtual machine, e.g. a private key 32 for the VM 16, update the host look-up table 80 to share data between the first level VM 12 and the second level VM 16. An identifier 40 is generated to identify the VM 16. The private keys 32 are written into the hardware. The key look-up table 80 in the memory 66 for the firmware controlled area is updated and the VM 16 starts execution.

A private key 32 of a second level virtual machine 16 is used to encrypt all private data which should not be readable by any other VM or host. In case the thread is running in the VM 16 the firmware 70 provides that this private key 32 is written into the hardware to be used as default key. A key 36 is used to share information between first level and second level virtual machines, e.g. in case of interceptions, the host 1 needs to access all information necessary to fix the problem. Also the communication between the virtual machines is performed using this key 36. The key 36 is used by the firmware 70 only. Also a separate key 37 is used to share information between second level virtual machines, see FIG. 7.

Figure 7:
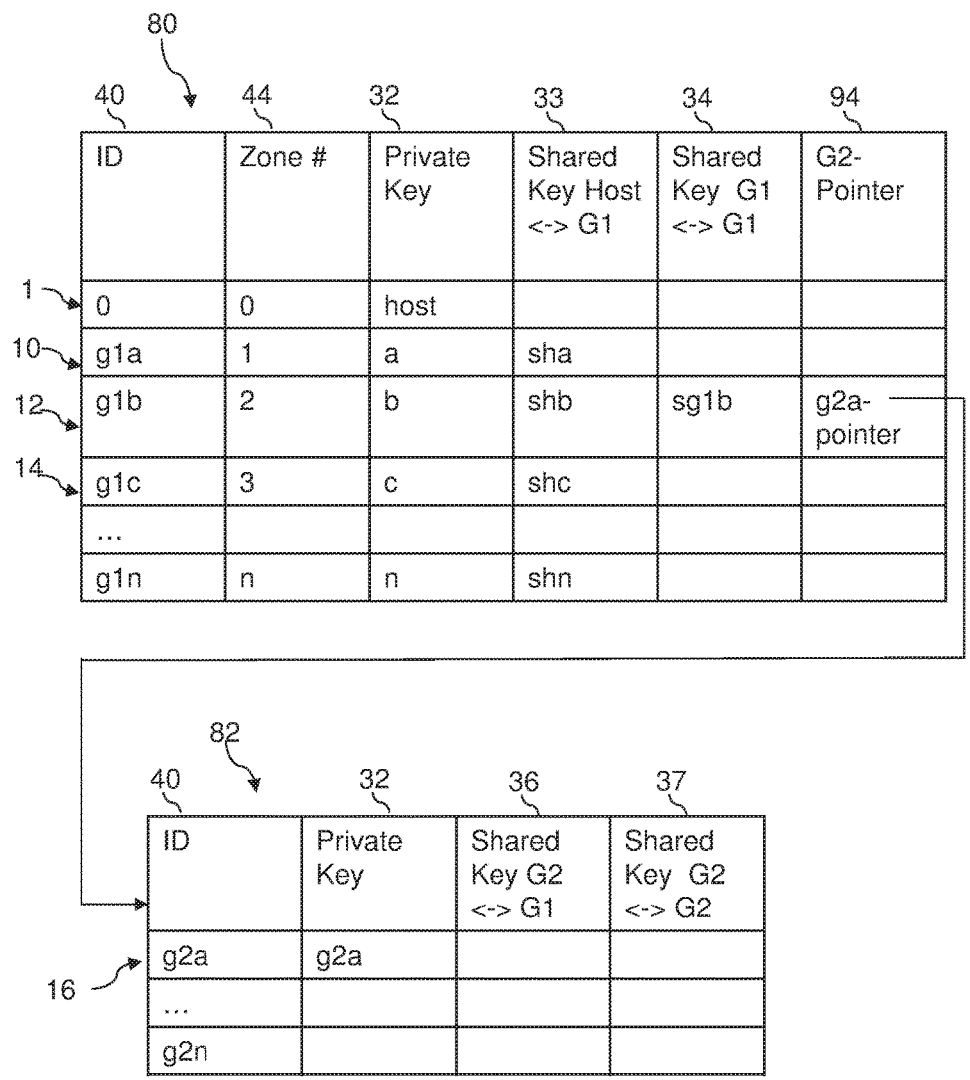
FIG. 7 is a look-up table for the memory layout of FIG. 6 with an extended look-up table for second level virtual machines according to an embodiment of the present invention.
Figure 8:
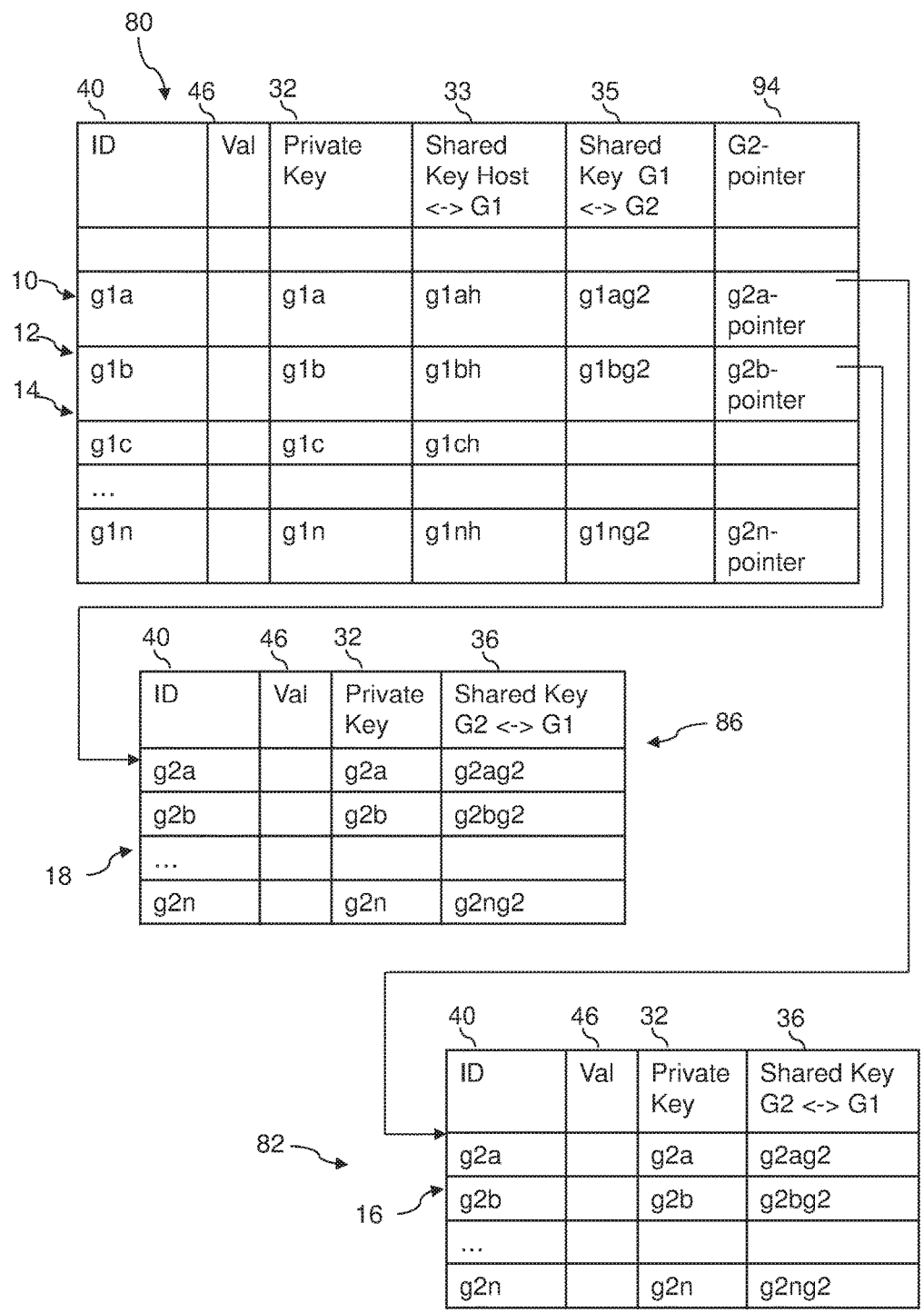
FIG. 8 is a look-up table for the memory layout with extended look-up tables of two first level virtual machines running according to a further embodiment of the present invention.

FIG. 6 shows a memory layout of a computer system 212 according to an embodiment of the present invention with virtual machines 12, 16 of first and second level virtualization running. FIG. 6 only displays the private memory 62 of the first level virtual machine 12, encrypted by the corresponding key (indicated in the table as Key=b) and the private memory 62 of the second level virtual machine 16, created by first level virtual machine 12 and encrypted by the corresponding key (indicated in the table as Key=g2a). The private memories 62 also exhibit shared memory regions 64, a first one of virtual machine 12 being readable by virtual machine 16 and a second one of virtual machine 16 being readable by virtual machine 12. Thus a secure memory region 64 encrypted by a virtual-machine-specific encryption key 32, 33, 34, 35, 36, 37 may be shared between virtual machines 12, 16 of a different virtualization level. Read access rights are controlled by look-up tables 80, 82 as shown in FIGS. 7 and 8. Shared memory regions 64 may be used in case of interception or for communication between virtual machines 10, 16.

In FIG. 7 a corresponding look-up table 80 for the memory layout of FIG. 6 with an extended look-up table 82 for the second level virtual machines according to an embodiment of the present invention is depicted. Table means as specific services, e.g. hardware or firmware routines, of the computer system 212 are used for providing at least one second look-up table 82 for storing virtual-machine-specific encryption keys 32, 36, 37 of second level virtual machines like the VM 16 with the identifier ID=g2a and the private key 32 (indicated in the table as Key=g2a), being created by first level virtual machines. The look-up table 80 covers basic information for the host 1 as well as the virtual machines 10, 12, 14, namely the identifier 40 (indicated in the table as 0, g1a, g1b, g1c, . . . ), the zone number 44 (indicated in the table as 0, 1, 2, 3, . . . ) of the memory 60, the private key 32 (indicated in the table as host, a, b, c, . . . ) for access to the private memory 62. Further the look-up table 80 contains shared keys 33 (indicated in the table as sha, shb, shc, . . . ) for access to shared memory regions 64 between host and first level virtual machines like the VMs 10, 12, 14 as well as shared keys 34 (indicated in the table as sg1b) for access to shared memory regions 64 between the first level virtual machines like the VMs 10, 12, 14 among each other.

Pointer means of the computer system 212, e.g. hardware or firmware routines, are used for providing at least one pointer 94 to be used for extension of the table 80. The table 82 contains information as mainly the private key 32 (indicated in the table as g2a) of the virtual machines like VM 16 for access to the private memory 62, as well as shared keys 36 for access to shared memory regions 64 between second level virtual machines like VM 16 and first level virtual machines like VM 10, 12, 14 as well as shared keys 37 for access to shared memory regions 64 between the second level virtual machines among each other. The pointer 94 originating from VM 12 is directly pointing to the look-up table 82 where under the identifier 40 of the VM 16 virtual-machine-specific information like the keys 32, 36, 37 may be found.

FIG. 8 shows a look-up table 80 for the memory layout with extended look-up tables 82, 86 of two first level virtual machines 10, 12 running according to a further embodiment of the present invention. The pointer 94 initiated by the first level virtual machine 10 is pointing to the look-up table 82, where information of second level virtual machines is stored. Another pointer 94 is pointing to the separate look-up table 86, where also information of second level virtual machines is stored. Thus each first level virtual machine may be configured to have its own look-up table 82, 86 with information about second level virtual machines. Under the respective identifier 40 of a second level virtual machine like VM 18 (indicated in the table as g2b), being created by VM 12, or like VM 16 (indicated in the table as g2a), being created by VM 10, the appropriate keys (indicated in the table as g2b, g2a) may be retrieved from the respective lines in the look-up tables 82, 86 for accessing private memories or shared memory regions of the respective virtual machines 16, 18 and vice versa.

Look-up table 80 in FIG. 8 also exhibits shared keys 33 for sharing information between host and first level VMs (indicated in the table as g1ah, g1bh, g1ch, . . . ) as well as shared keys 35 for sharing information between first and second level VMs (indicated in the table as g1ag2, g2bg2, . . . ). Further there are the pointers 94 listed pointing to the extended look-up tables 82, 86 (indicated in the table as g1a-pointer, g2b-pointer, . . . ).

Additionally a column for the valid flag 46 is foreseen in the look-up tables 80, 82, 86 of the embodiment shown in FIG. 8 for information about the validity of the data being stored in the respective look-up table 80, 82, 86 for the respective virtual machine. Flag means, e.g. hardware or firmware routines, of the computer system 212 may be used for providing the valid flag 46 for indicating valid information in the tables 80, 82, 84, 86. The valid flag 46 is inheritable from a first level virtual machine to a lower level virtual machine. Due to an alternative embodiment even each field in the look-up tables 80, 82, 84, 86 may be provided with an own valid flag 46. Thus each field may be controlled for valid information separately.

Further translation means, e.g. hardware or firmware routines, of the computer system 212 may be used for providing a translation key 39 for using dynamic translation tables of a second level virtual machine 16 for pages of the second level virtual machine 16 written to or read from the memory 60.

Figure 9:
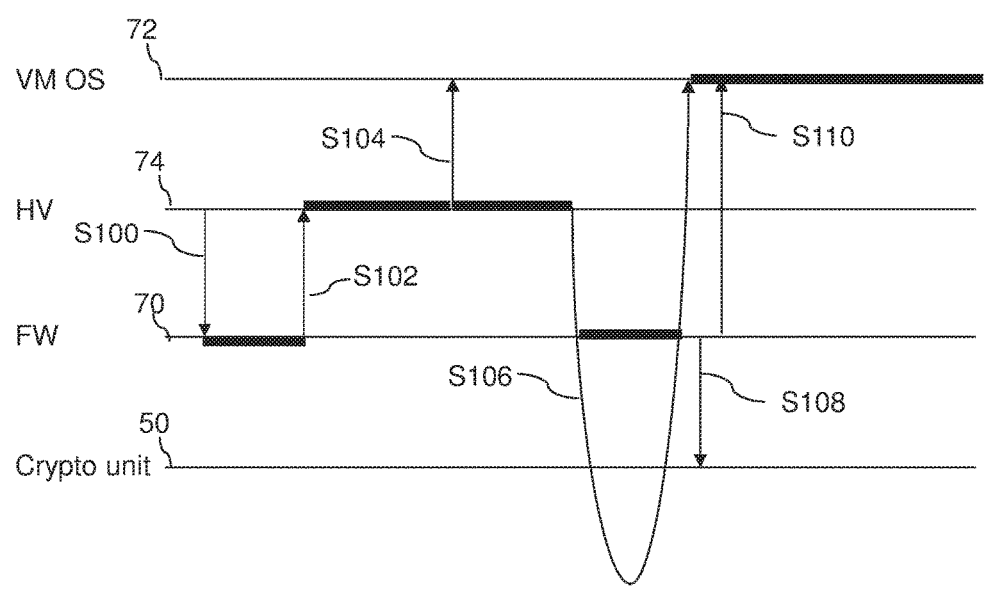
FIG. 9 is a scheduling sequence for the initialization of a virtual machine according to an embodiment of the present invention.

In FIG. 9 a scheduling sequence for the initialization of a virtual machine 10 according to an embodiment of the present invention is shown. For initialization of a virtual machine 10 with a VM operating system 72, the firmware 70 in step S100, initiated by the hypervisor 74, adds a new entry to the look-up table 80 with the identifier 40 of the VM 10, the private key 32 and the flag 42 indicating that the VM 10 was not yet running, referring to FIG. 1. In step S102 the VM identifier is returned to the caller. In step S104 the initial data, e.g. the bootloader, can be written by the hypervisor 74. Next, in step S106, the VM start routine is called including the identifier 40 of the VM 10 in the state descriptor unit 22. The cache with the hypervisor content is written back to the memory 60 and cleared. Then it is checked by the flag 42, if this is the first execution of the VM 10. If it is the first execution, in the context of the firmware 70, data are loaded with the host key block by block from the memory 60 to the cache and written back to the protected memory 62 with the private key 32 of the VM 10, step S106. Then the flag 42 is set to "already executed". In step S108 the private key 32 is loaded from the look-up table 80 and the host identifier stored for a VM exit routine. In step S110 a switch to VM code execution with the private key 32 of the VM 10 loaded is performed.

Figure 10:
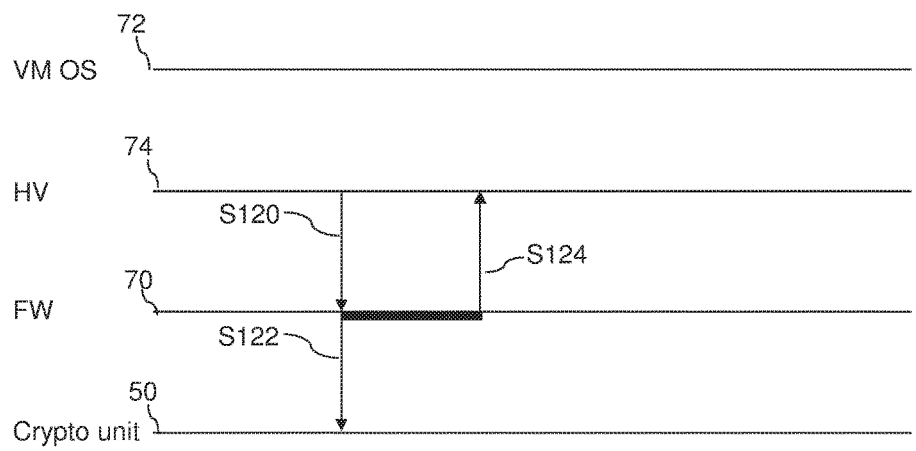
FIG. 10 is a scheduling sequence for the interruption of a virtual machine according to an embodiment of the present invention.

In FIG. 10 a scheduling sequence for the interruption of the virtual machine 10 according to an embodiment of the present invention is shown. The VM 10 is interrupted and a VM exit routine is triggered in step S120. Next, in step S122, the hypervisor key is restored in the crypto unit 50 and the cache is written back to the memory 60 and cleared. In order to improve the security the VM registers may be encrypted. In step S124 control is returned to the hypervisor 74 and the VM is stopped.

Figure 11:
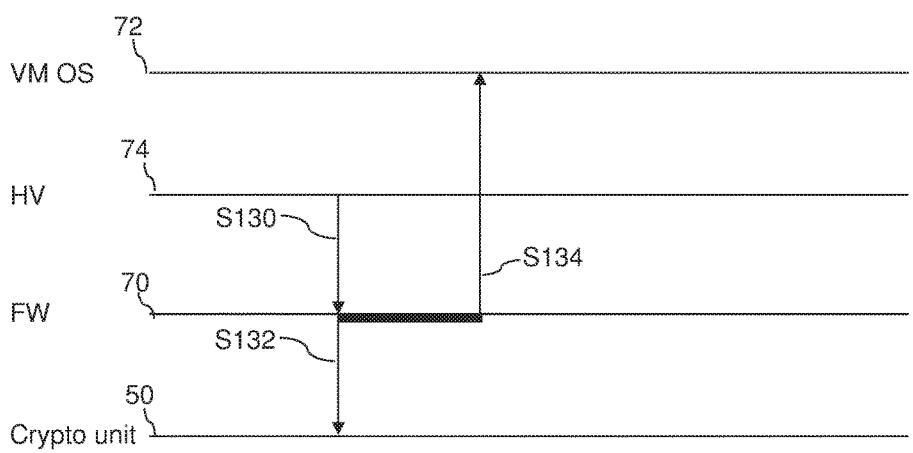
FIG. 11 is a scheduling sequence for the continuation of a virtual machine according to an embodiment of the present invention.

In FIG. 11 a scheduling sequence for the continuation of the virtual machine 10 according to an embodiment of the present invention is shown. In step S130, the VM start routine is called including the identifier 40 of the VM 10 in the state descriptor unit 22. The cache with the hypervisor content is written back to the memory 60 and cleared. Then it is checked if this is the first execution of the VM 10 according the flag 42 in the look-up table 80. If this is not the first execution, in firmware context the private key 32 is loaded from the look-up table 80 into the crypto unit 50 in step S132 and the host identifier is stored for restore on an VM exit routine. Then, in step S134, a switch to VM code execution with the private key 32 of the VM 10 loaded is performed.

Figure 12:
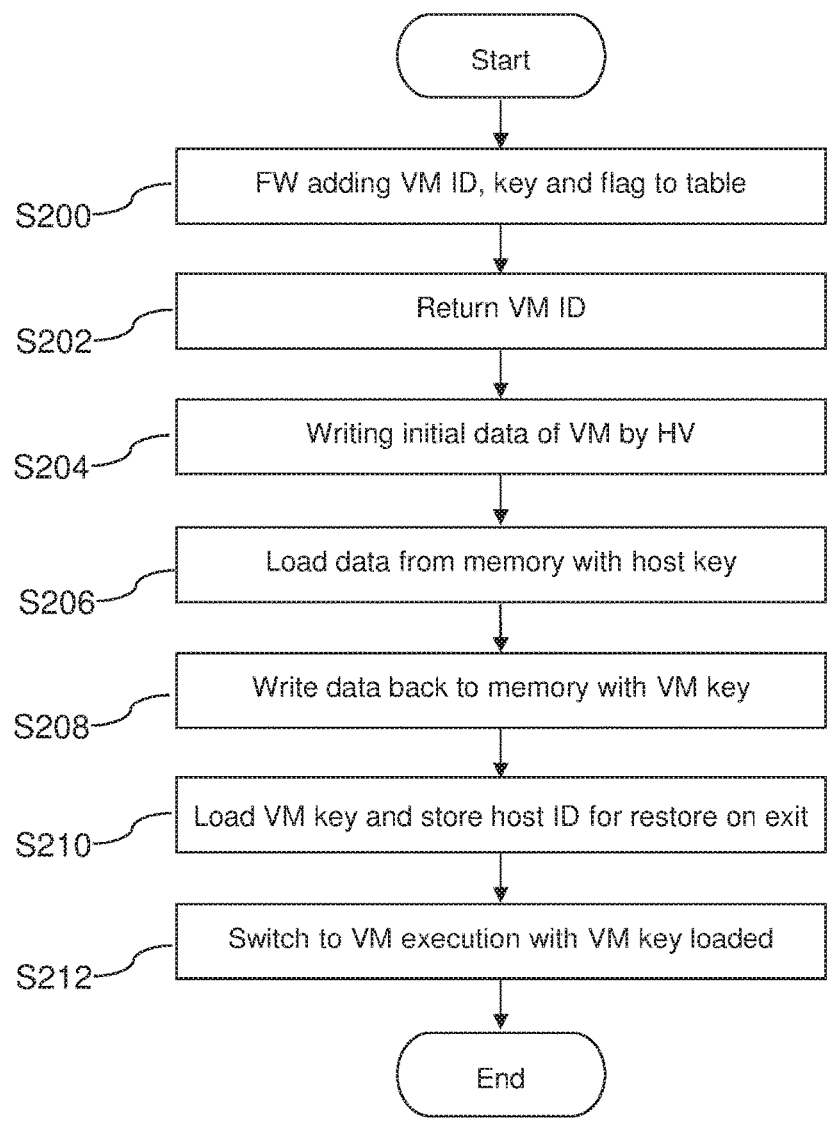
FIG. 12 is a flowchart for the initialization of a virtual machine according to an embodiment of the present invention.

FIG. 12 depicts a flowchart for the initialization of the virtual machine 10 according to an embodiment of the present invention. Referring to FIG. 1 again, for initialization of the virtual machine 10 with a VM operating system 72, the firmware 70, initiated by the hypervisor 74, adds a new entry to the look-up table 80 with the identifier 40 of the VM 10, the private key 32 and the flag 42 indicating that the VM 10 was not yet running, as indicated in step S200. In step S202 the VM identifier is returned to the caller. In step S204 the initial data, e.g. the bootloader, is written by the hypervisor 74. Next, the VM start routine is called including the identifier 40 of the VM 10 in the state descriptor unit 22. The cache with the hypervisor content is written back to the memory 60 and cleared. Then it is checked by the flag 42, if this is the first execution of the VM 10. If it is the first execution, in the context of the firmware 70, data are loaded with the host key block by block from the memory 60 to the cache in step S206 and written back to the protected memory 62 with the private key 32 of the VM 10, step S208. Then the flag 42 is set to "already executed". In step S210 the private key 32 is loaded from the look-up table 80 and the host identifier stored for a VM exit routine. In step S212 a switch to VM code execution with the private key 32 of the VM 10 loaded is performed.

Advantageously data of virtual machines at different virtualization levels may be encrypted with their own virtual machine specific encryption keys. Particularly memory regions used by virtual machines of second level virtualization are protected against access of the operating system and the hypervisor running on the computer system. Thus a better granularity of the proposed computer system on a virtual machine level is achievable compared to other computer systems.

Further an advantageous method for protecting contents of a memory in a computer system from unauthorized access is proposed. The computer system comprises a processor and a main memory, where the processor is configured to have support for execution of multiple virtual machines. The support may be hardware support or software support or both. The memory is accessible in pages of equal size. The computer system further comprises a crypto unit arranged between the processor and the memory to encrypt or decrypt, respectively, pages written to or read from the memory by the processor by using an encryption key stored in the crypto unit. The computer system comprises (i) generating and storing one or more virtual-machine-specific encryption keys for a dedicated virtual machine in a protected memory, the protected memory being selectively excluded from access by operating systems executable on the computer system. The computer system further comprises (ii) storing at least one look-up table in the protected memory, where for the dedicated virtual machine one or more virtual-machine-specific encryption keys are stored, the look-up table being accessible by firmware of the computer system only. And the computer system further comprises (iii) replacing the encryption key stored in the crypto unit with at least one of the virtual machine specific encryption keys stored in the at least one look-up table, in an operation mode where the dedicated virtual machine is executed by the processor.

Further a favorable computer program product for protecting contents of a memory in a computer system from unauthorized access is proposed. The computer system comprises a processor and a main memory. The processor is configured to have support for execution of multiple virtual machines. The support may be hardware or software support. The memory is accessible in pages of equal size. The computer system further comprises a crypto unit arranged between the processor and the memory to encrypt or decrypt, respectively, pages written to or read from the memory by the processor by using an encryption key stored in the crypto unit, the computer program product comprising a computer readable storage medium having program instructions embodied therewith, the program instructions executable by a computer to cause the computer to perform a method comprising (i) generating and storing one or more virtual-machine-specific encryption keys for a dedicated virtual machine in a protected memory being selectively excluded from access by operating systems executable on the computer system; (ii) storing at least one look-up table in the protected memory, where for the dedicated virtual machine one or more virtual-machine-specific encryption keys are stored, the look-up table being accessible by firmware of the computer system only; (iii) replacing the encryption key stored in the crypto unit with at least one of the virtual-machine-specific encryption keys stored in the at least one look-up table, in an operation mode where the dedicated virtual machine is executed by the processor.

Due to a further aspect of the present invention, a data processing system for execution of a data processing program is proposed, comprising computer readable program instructions for performing a method described above.

Figure 13:
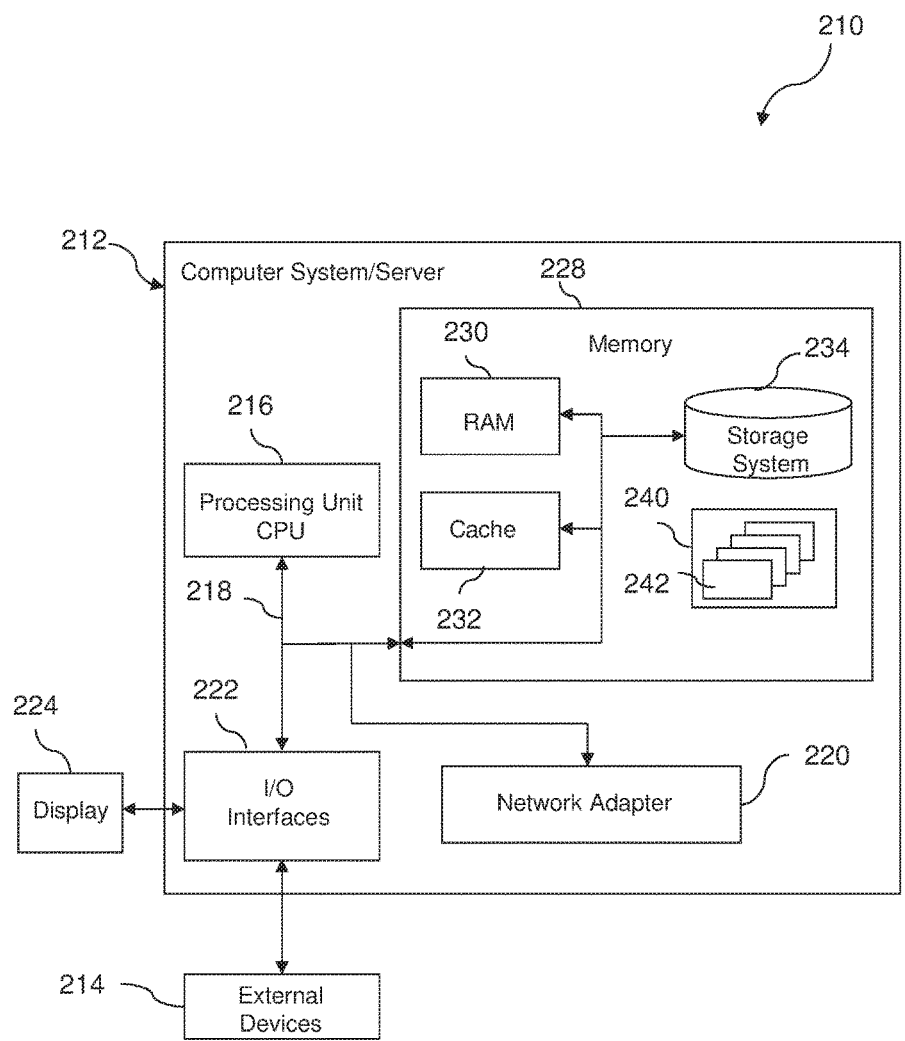
FIG. 13 is an example embodiment of a data processing system for executing a method according to the present invention.

Referring now to FIG. 13, a schematic of an example of a data processing system 210 is shown. Data processing system 210 is only one example of a suitable data processing system and is not intended to suggest any limitation as to the scope of use or functionality of embodiments of the present invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 13, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the present invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the present invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as may be being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

The invention claimed is:

1. A method comprising:
receiving, by a firmware component and from a hypervisor, a request for a dedicated virtual machine (VM);
generating, by the firmware component, a set of virtual-machine-specific (VMS) encryption keys for VM data stored by the dedicated VM in a protected memory region to which the firmware component has access;
establishing, by the firmware component, the dedicated VM in a first look-up table by recording to the first look-up table a first identifier corresponding to the dedicated VM and the set of VMS encryption keys generated by the firmware component for the dedicated VM, the first look-up table being stored in the protected memory region only accessible by the firmware component;
transmitting, by the firmware component, to the hypervisor the first identifier;
executing, by the firmware component, a start routine for the dedicated VM including:
transferring hypervisor content from a cache to a main memory;
clearing the cache;
recording initial VM data to the cache using a host key;
accessing, by the firmware component, the VM data stored in the protected memory region by using the set of VMS encryption keys corresponding to the dedicated VM in the first look-up table;
storing the initial VM data in the protected memory region for the dedicated VM by using access provided by the set of VMS encryption keys; and
recording the set of VMS encryption keys and a host identifier to the cache; and
responsive to an interruption of the dedicated VM, replacing the set of VMS encryption keys recorded to the cache with the hypervisor content including the host key;
wherein:
the protected memory region of the firmware component is a firmware-controlled memory selectively excluded from access by all operating systems and hypervisors executable on a computer system; and
the first look-up table is accessible only by the firmware component of the computer system.

2. The method of claim 1, further comprising:
applying an encryption key of the set of VMS encryption keys stored in the cache to pages for processing by a processor.

3. The method of claim 1, wherein the set of VMS encryption keys are generated by the firmware component and/or hardware of the computer system.

4. The method of claim 1, further comprising:
replacing a host encryption key in the cache with at least one VMS encryption key from the set of VMS encryption keys upon initializing the dedicated VM.

5. The method of claim 1, further comprising:
sharing a secure memory region between a set of virtual machines, the secure memory region being encrypted by a VMS encryption key of the set of VMS encryption keys.

6. The method of claim 1, further comprising:
providing a second look-up table for storing a second set of VMS encryption keys of a second level virtual machine.

7. The method of claim 1, wherein at least one VMS encryption key of the set of VMS encryption keys is identified in the first look-up table by a machine identifier for the dedicated VM.

8. The method of claim 1, further comprising:
allocating a machine identifier and at least one VMS encryption key of the set of VMS encryption keys when establishing the dedicated VM.

9. The method of claim 1, wherein the establishing the dedicated VM in a first look-up table is initiated by the hypervisor, responsive to the request for a dedicated virtual machine.

10. The method of claim 1, wherein the protected memory region is assigned, by the firmware component, for use by the dedicated VM.

11. The method of claim 1, further comprising:
creating, by the dedicated VM, a second dedicated VM according to a hierarchical structure; and
sharing, by the firmware component, the set of VMS encryption keys with the second dedicated VM for parallel operation of the dedicated VM and the second dedicated VM while exchanging stored VM data including the VM data and the initial VM data through the protected memory region.

* * * * *